US007047643B2

(12) United States Patent
Maeda et al.

(10) Patent No.: US 7,047,643 B2
(45) Date of Patent: May 23, 2006

(54) METHOD OF MANUFACTURING INK JET HEADS

(75) Inventors: Kikuo Maeda, Hachioji (JP); Koji Fukazawa, Tachikawa (JP); Kazuhiko Tsuboi, Tama (JP); Tadashi Hirano, Hino (JP)

(73) Assignee: Konica Corporation, Tokyo (JP)

( * ) Notice: Subject to any disclaimer, the term of this patent is extended or adjusted under 35 U.S.C. 154(b) by 469 days.

(21) Appl. No.: 10/373,956

(22) Filed: Feb. 26, 2003

(65) Prior Publication Data

US 2003/0167637 A1 Sep. 11, 2003

(30) Foreign Application Priority Data

Mar. 7, 2002 (JP) ............................ 2002-061814

(51) Int. Cl.
*B21D 53/76* (2006.01)
*B23D 17/00* (2006.01)

(52) U.S. Cl. ...................... 29/890.1; 29/25.35; 29/830; 347/44

(58) Field of Classification Search ............... 29/890.1, 29/25.35, 830; 310/311, 348, 357, 342; 347/44, 347/47, 54; 156/306.6
See application file for complete search history.

(56) References Cited

U.S. PATENT DOCUMENTS

| | | | | |
|---|---|---|---|---|
| 5,631,680 | A * | 5/1997 | Sugahara | 347/69 |
| 5,734,395 | A * | 3/1998 | Kamisuki et al. | 347/54 |
| 5,889,539 | A * | 3/1999 | Kamoi et al. | 347/50 |
| 6,332,669 | B1 * | 12/2001 | Kato et al. | 347/54 |

FOREIGN PATENT DOCUMENTS

| | | |
|---|---|---|
| JP | 2633943 | 4/1999 |
| JP | 11-320873 | * 11/1999 |

* cited by examiner

*Primary Examiner*—A. Dexter Tugbang
*Assistant Examiner*—Tai Van Nguyen
(74) *Attorney, Agent, or Firm*—Frishauf, Holtz, Goodman & Chick, P.C.

(57) ABSTRACT

A method of manufacturing an ink jet head, characterized in having the steps of: bonding a nozzle plate and a support member by heating to make a composite member; forming nozzle holes in the nozzle plate of the composite member; and bonding the composite member having the nozzle holes formed to an actuator by heating with the use of a thermosetting adhesive, in such a manner that the support member side of the composite member comes to be in contact with the actuator.

26 Claims, 5 Drawing Sheets

METHOD OF MANUFACTURING INK JET HEADS

BACKGROUND OF THE INVENTION

This invention relates to a method of manufacturing ink jet heads, and in particular, to a method of manufacturing ink jet heads wherein relative deviation of elongation owing to heating at the time the nozzle plate and the main body of the actuator are bonded together is prevented.

Heretofore, for a method of manufacturing ink jet heads, it was proposed and has been put into practice a method in which holes were made from the outside (front side) in the nozzle plate by a laser beam after it was bonded to the actuator. On the other hand, from the viewpoint of ink jetting characteristics (ink jetting direction, jetting amount, failure in jetting due to the suction of air after jetting, smudging and wetting on the outer surface of the nozzle plate, etc.), it is known that the shape of the nozzle holes having a structure tapering off towards the outside from the ink room is desirable. In the method in which holes were made from the outside (front side) of the nozzle plate, a complicated process was required for making the above-mentioned shape of the nozzle holes, which raised a problem in accuracy and productivity.

On the other hand, it is proposed a method wherein holes are made from the side of the ink room (rear side) of the actuator by a laser beam after the nozzle plate is bonded to the actuator. However, this method cannot be practiced for an ink jet head having the closed rear side although it depends on the type of its actuator; further, even for an ink jet head having the open rear side, when the depth of the actuator is large, it has been produced a problem that the laser beam was intercepted by partition walls of the channel grooves. Therefore, in the Japanese Patent No. 2,633,943, there is disclosed a technology in which nozzle holes are formed by the irradiation from the obliquely upward direction of the channel grooves. However, in this method, the irradiation is made from the obliquely upward direction, which makes the nozzles have an inclination (unable to be perpendicular to the nozzle plate), and the restriction in the working for obtaining proper ink jetting characteristics is very severe.

On the other hand, it is known a method in which nozzle hole working is applied to the nozzle plate in advance, and after that, the nozzle plate is bonded to the actuator with an adhesive.

For the material of the nozzle plate, resin materials such as polyimide have been used from the viewpoint of workability, durability, etc. It is known a method of manufacturing ink jet heads wherein nozzle holes are made beforehand in a resin material such as polyimide or the like and it is bonded to the actuator made of PZT (lead titanate-zirconate) by heating with a thermosetting adhesive to make the productivity good. However, in this method, it is required to make the adhesive be kept at a high temperature for the purpose of hardening the adhesive, and the nozzle plate and the actuator both come to be put under the same high-temperature environment. At this time, owing to the difference in the thermal expansion coefficient between the nozzle plate having a larger thermal expansion coefficient and the actuator having a smaller thermal expansion coefficient, the amount of elongation is different between the both, and they come to be bonded with the channel positions of the actuator deviated from the nozzle hole positions. This deviation is firmly held by the adhesive when the temperature drops to the normal temperature after the bonding; therefore, it is not removed, and as the result, there has been a problem that a positional deviation of the nozzle holes was inevitably produced.

SUMMARY OF THE INVENTION

That is, it is an object of this invention to provide a bonding method and a method of manufacturing ink jet heads wherein, in the process of bonding the nozzle plate having nozzle holes with a desirable shape formed beforehand to the actuator by the use of a thermosetting adhesive, positional deviation between the channel grooves of the actuator and the nozzle holes can be decreased.

The above-mentioned problem can be solved by the structures of this invention as described below.

(1) A method of manufacturing ink jet heads characterized by comprising the process of bonding a nozzle plate before the working of the nozzle holes and a support member by heating to make a composite member, the process of forming nozzle holes in said nozzle plate of said composite member, and the process of bonding said composite member having said nozzle holes formed to the actuator by heating by the use of a thermosetting adhesive, in such a manner that the support member side of the composite member comes to be in contact with the actuator.

(2) A method of manufacturing ink jet heads as set forth in the structure (1) characterized by the linear coefficient of thermal expansion of the aforesaid composite member (αf) satisfying the inequality 1 described below.

$$\alpha f<(w/2)/(L\times\Delta T)+\alpha a \quad \text{Ineq. 1,}$$

where

αf: the linear coefficient of thermal expansion of the composite member,

αa: the linear coefficient of thermal expansion of the actuator, w: the channel width in the actuator, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(3) A method of manufacturing ink jet heads as set forth in the structure (1) characterized by the linear coefficient of thermal expansion of the aforesaid composite member satisfying the inequality 2 described below.

$$\alpha f<[(w-d)/2+d/4]/(L\times\Delta T)+\alpha a \quad \text{Ineq. 2,}$$

where

αf: the linear coefficient of thermal expansion of the composite member,

αa: the linear coefficient of thermal expansion of the actuator, w: the channel width in the actuator, d: the nozzle diameter at the side of the ink room, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(4) A method of manufacturing ink jet heads as set forth in the structure (1) characterized by the linear coefficient of thermal expansion of the aforesaid composite member satisfying the inequality 3 described below.

$$\alpha f<[(w-d)/2]/(L\times\Delta T)+\alpha a \qquad \text{Ineq. 3,}$$

where

αf: the linear coefficient of thermal expansion of the composite member,

αa: the linear coefficient of thermal expansion of the actuator, w: the channel width in the actuator, d: the nozzle diameter at the side of the ink room, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(5) The method of manufacturing an ink jet head as set forth in the structure (1), wherein the linear coefficient of thermal expansion of the composite member (αf) and the linear coefficient of thermal expansion of the actuator (αa) satisfy the inequality 4 described below, $$?\alpha f-\alpha a?<w/2/(L\times\Delta T) \qquad \text{the inequality 4}$$

where,

αf: the linear coefficient of thermal expansion of the composite member,

αa: the linear coefficient of thermal expansion of the actuator, w: the channel width in the actuator, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(6) The method of manufacturing an ink jet head as set forth in the structure (1), wherein the linear coefficient of thermal expansion of the composite member (αf) and the linear coefficient of thermal expansion of the actuator (αa) satisfy the inequality 5 described below, $$?\alpha f-\alpha a?<[(w-d)/2+d/4]/(L\times\Delta T) \qquad \text{the inequality 5}$$

where,

αf: the linear coefficient of thermal expansion of the composite member,

αa: the linear coefficient of thermal expansion of the actuator, w: the channel width in the actuator, d: the nozzle diameter at the side of the ink room, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(7) The method of manufacturing an ink jet head as set forth in the structure (1), wherein the linear coefficient of thermal expansion of the composite member (αf) and the linear coefficient of thermal expansion of the actuator (αa) satisfy the inequality 6 described below, $$?\alpha f-\alpha a?<[(w-d)/2]/(L\times\Delta T) \qquad \text{the inequality 6}$$

where,

αf: the linear coefficient of thermal expansion of the composite member,

αa: the linear coefficient of thermal expansion of the actuator, w: the channel width in the actuator, d: the nozzle diameter at the side of the ink room, ΔT: the temperature difference between maximum and minimum temperatures during the bonding process of the composite member to the actuator by heating, P: the pitch of the nozzle holes, n: the number of nozzles, L: the length between both end sided nozzle holes in the composite member=P×(n−1).

(8) The method of manufacturing an ink jet head as set forth in the structure (1), wherein the thickness of the supporting member is from 0.2 mm to 1.0 mm.

(9) A method of manufacturing ink jet heads as set forth in any one of the structures (1) to (8) characterized by the support member having an opening portion.

(10) A method of manufacturing ink jet heads as set forth in the structure (9) characterized by the shape of the opening portion being the shape corresponding to the channel grooves formed in the actuator.

(11) A method of manufacturing ink jet heads as set forth in any one of the structures (1) to (10) characterized by the nozzle holes being formed from the support member side by laser working.

(12) A method of manufacturing ink jet heads characterized by comprising the process of bonding a nozzle plate before the working of nozzle holes and a support member by heating to make a composite member, the process of forming nozzle holes in said nozzle plate of said composite member, and the process of bonding said composite member having said nozzle holes formed to the actuator by heating by the use of a thermosetting adhesive, in such a manner that the nozzle plate side of the composite member comes to be in contact with the actuator.

(13) A method of manufacturing ink jet heads as set forth in the structure (12) characterized by the linear coefficient of thermal expansion of the aforesaid composite member (αf) satisfying the above-mentioned inequality 1.

(14) A method of manufacturing ink jet heads as set forth in the structure (12) characterized by the linear coefficient of thermal expansion of the aforesaid composite member (αf) satisfying the above-mentioned inequality 2.

(15) A method of manufacturing ink jet heads as set forth in the structure (12) characterized by the linear coefficient of thermal expansion of the aforesaid composite member (αf) satisfying the above-mentioned inequality 3.

(16) A method of manufacturing ink jet heads as set forth in the structure (12) characterized by the linear coefficient of thermal expansion of the aforesaid composite member (αf) satisfying the above-mentioned inequality 4.

(17) A method of manufacturing ink jet heads as set forth in the structure (12) characterized by the linear coefficient of thermal expansion of the aforesaid composite member (αf) satisfying the above-mentioned inequality 5.

(18) A method of manufacturing ink jet heads as set forth in the structure (12) characterized by the linear coefficient of thermal expansion of the aforesaid composite member (αf) satisfying the above-mentioned inequality 6.

(19) The method of manufacturing an ink jet head as set forth in structure (12), wherein the thickness of the supporting member is from 0.2 mm to 1.0 mm.

(20) A method of manufacturing ink jet heads as set forth in any one of the structures (12) to (18) characterized by the support member having an opening portion.

(21) A method of manufacturing ink jet heads as set forth in the structure (20) characterized by the shape of the opening portion being the shape corresponding to the channel grooves formed in the actuator.

(22) A method of manufacturing ink jet heads as set forth in the structure (20) characterized by the shape of the opening portion being the shape of a ladder with one opening formed for every two or more plural channel grooves in the actuator.

(23) A method of manufacturing ink jet heads as set forth in the structure (20) characterized by the shape of the opening portion being the shape of the outer frame including the total channel grooves of the actuator.

(24) A method of manufacturing ink jet heads as set forth in any one of the structures (12) to (20) characterized by the nozzle holes being formed from the nozzle plate side by laser working.

(25) A method of manufacturing ink jet heads as set forth in any one of the structures (12) to (24) characterized by comprising the process of removing the support member after the composite member and the actuator are bonded together by heating.

(26) A method of manufacturing ink jet heads as set forth in any one of the structures (1) to (25) characterized by the position adjustment at the time the composite member and the actuator are bonded together by heating being made by a method of pressing contact with a fixture.

That is, in the case where a nozzle plate made of a material having a thermal expansion coefficient different from that of an actuator made of PZT or the like having a lower thermal expansion coefficient is bonded to the latter with a thermosetting adhesive, after the nozzle plate having no nozzle hole formed yet is first bonded to a support member having a thermal expansion coefficient which is the same as or equivalent to that of PZT by heating beforehand to make a composite member, nozzle holes are formed in the nozzle plate at the normal temperature, and the composite member having said nozzle holes formed is bonded to the actuator by heating; through these processes, because the thermal expansion coefficient of the composite member and that of the actuator are nearly equal, bonding can be done without producing a positional deviation of the nozzle holes against the channel grooves of the actuator. Further, it becomes easy to make the bonding in the direction such that the shape of the nozzle holes being broader at the ink room side and tapering off towards the outside.

Moreover, the composite member consisting of the nozzle plate and the support member bonded together is subjected to the formation of nozzle holes afterwards; in order to make the energy for forming the nozzle holes low as much as possible, it is desirable to make the support member have a shape having an opening portion corresponding to the nozzle holes.

In this invention, it is necessary that the thermal expansion coefficient of the composite member made up of the support member and the nozzle plate bonded together is approximately equal to that of the actuator; it is desirable that the linear coefficient of thermal expansion of the composite member satisfies the above-mentioned inequality 1, and further, it is desirable that it satisfies the above-mentioned inequality 2, and in particular, the inequality 3.

In this case, the inequality 1 expresses the allowable range of the elongation in this invention, and with the pitch denoted by P, the number of nozzles by n, the channel width by w, and the nozzle diameter at the ink room side by d, it is found that any problem in the performance is not produced in this invention, even if a positional deviation of the nth nozzle from the fixed point reaches a half of a channel groove; further, it is found that it is desirable for the closing of the nozzle holes a range up to a quarter of the nozzle diameter d at the ink room side against the edge, and in particular, it is found that it is desirable a range up to the point where an end portion of a nozzle hole becomes in contact with the edge of a channel groove as expressed by the inequality 3.

Because the member which is used for the actuator comes to have a sufficient strength if the composite member has a thermal expansion coefficient equivalent to that of the actuator, it is desirable to select a material which is the same as the actuator for the support member. Further, in order to make the support member have a shape having an opening portion corresponding to the channel grooves of the actuator, it is the easiest and most desirable way to make the support member through the cutting of the member formed as the actuator.

As for the thickness of the support member, the range of 0.2 mm to 1.0 mm is preferable from the points of workability and the strength of the support member.

For another example of the support member, one having a shape of a thin plate or a sheet, or one formed by coating may be appropriate. For the one having a shape of a thin plate or a sheet, a metallic plate, a glass sheet, a ceramic sheet, a synthetic resin sheet, and a composite material sheet composed of these with some of various kinds of filler added may be appropriate. For the one of a coating type, a resin film formed of thermosetting resin or ultraviolet-ray-setting resin with a filler such as carbon filament or para-type aramid fiber (for example, KEVLAR: made by DUPONT-TORAY CO., LTD.) may be appropriate, and the composite material can be formed by coating these resin on the nozzle plate.

For the thermosetting resin, various kinds of it are on the market, are easily available, and can be used without particular limitation; for example, Epotech 353ND produced by Epoxy Technology, Inc. etc. can be desirably used.

For the method of boring the nozzle holes, both laser working and press working can be practiced in accordance with the purpose of this invention; however, from the viewpoint of productivity, laser working, working by eximer laser in particular is desirable. For the direction of boring the nozzle holes, it may be done from the support member side or from the nozzle plate side; it is necessary as a satisfactory ink jet nozzle to make the hole shape taper off towards the nozzle exit, and by making the boring side come to the bonding surface, one can make the hole shape taper off towards the nozzle exit. In this invention, it is desirable from the viewpoint of productivity and working accuracy that the holes are made from the support member side of the composite member by laser working, and the support member side is made to come to the bonding surface with the actuator, which makes it possible to obtain various kinds of shape.

DETAILED DESCRIPTION OF THE PREFERRED EMBODIMENT

In the following, desirable examples of the embodiment of this invention will be explained with reference to the drawings, but this invention should not be limited to these.

Figure 1:
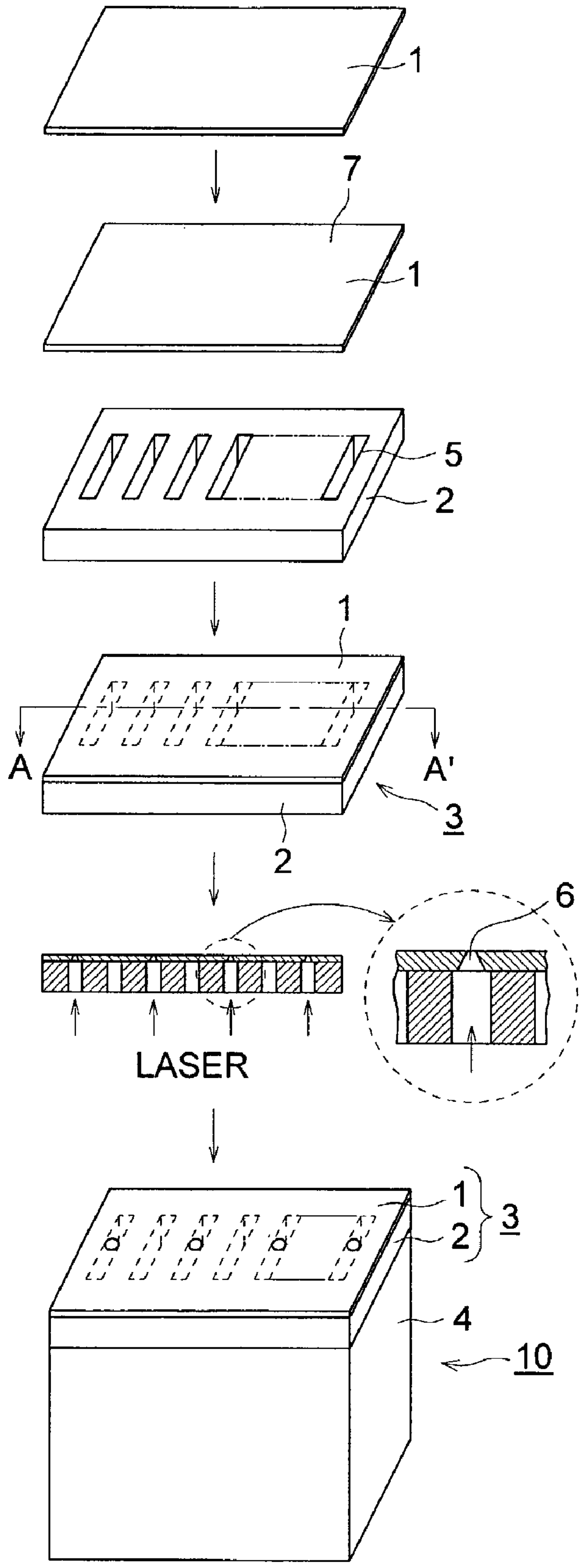
FIG. 1 is a process drawing showing a concrete example of a method of manufacturing ink jet heads of this invention.

FIG. 1 is a process drawing showing a concrete example of a method of manufacturing ink jet heads of this invention. After a water-repellent film 7 was formed on the surface of a nozzle plate 1 (linear coefficient of thermal expansion: 20 ppm) made of polyimide, a support member 2 made of PZT (linear coefficient of thermal expansion: 6 ppm) having opening portions corresponding to the channels of an actuator 4 was kept at 100° C. for 5 minutes with the use of a thermosetting adhesive Epotech 353ND (produced by Epoxy Technology, Inc.) to be bonded to the nozzle plate, and was left cooled to give a composite member 3.

Nozzle holes 6 were formed from the support member side of the obtained composite member 3 by a laser beam, and the shape of the nozzle hole was such that it is broad at the support member side, and tapers off towards the outside (refer to the enlarged drawing).

With the support member side of the composite member having nozzle holes formed made to become the bonding surface, the actuator 4 made of PZT having channel grooves formed was coated with the above-mentioned thermosetting adhesive, and bonding by heating at 100° C. for 5 minutes was practiced, which gave an ink jet head 10.

Figure 4:
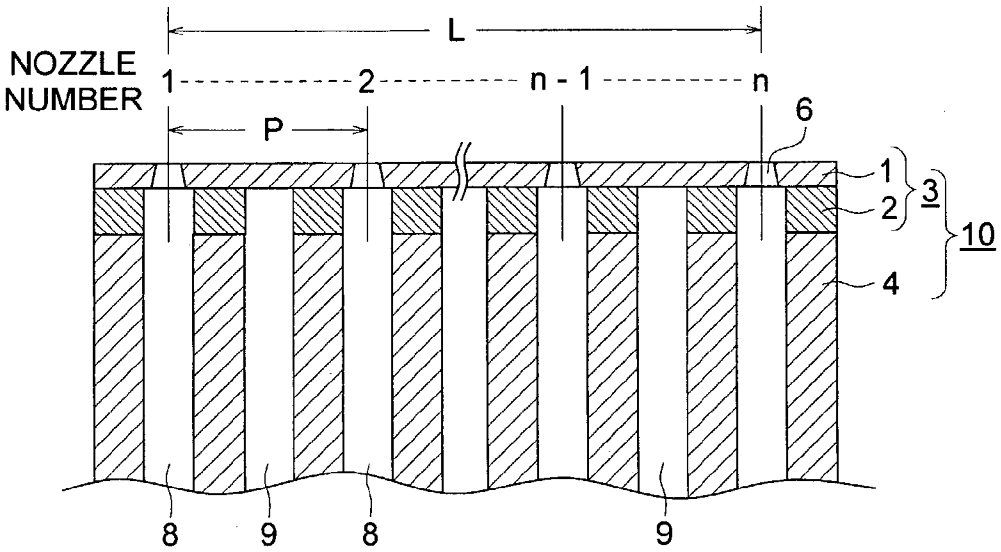
FIG. 4(*a*) to FIG. 4(*c*) are cross-sectional views of ink jet heads.
Figure 4:
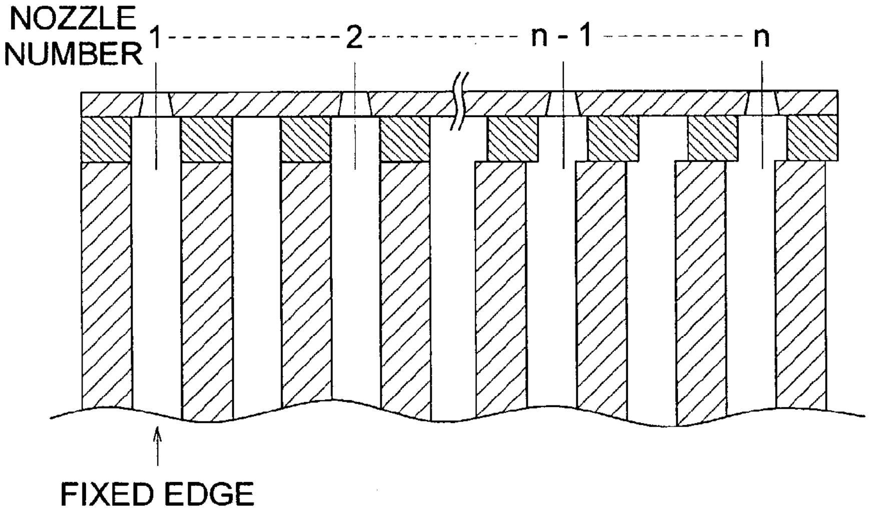
Figure 4:
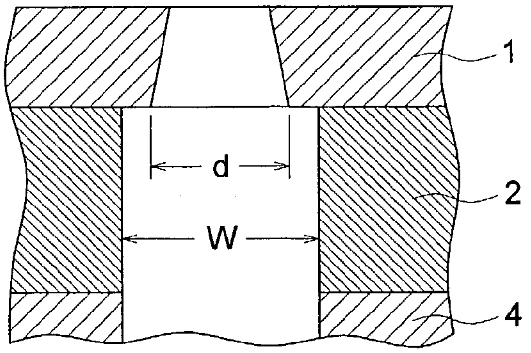

FIG. 4(*a*) to FIG. 4(*c*) are cross-sectional views of ink jet heads at a plane including all the nozzle holes, and showing schematically partial structures of a sheared mode type ink jet heads, which are shown in Japanese patent application No.2002-29885.

In FIG. 4(*a*) represents the state of bonding of the ink jet head 10 in the case where the thermal expansion coefficient of the composite member 3 and that of the actuator 4 completely agree with each other, and (b) represents the state of bonding of the ink jet head 10 in the case where the thermal expansion coefficient of the composite member 3 is larger than that of the actuator 4 and deviation is produced. (c) is an enlarged cross-sectional view of a nozzle hole part.

P denotes the pitch, which represents the distance between the neighboring nozzle centers, n denotes the number of nozzles, L denotes the total length, which represents the distance between the nozzle centers at both the end positions, and is equal to P×(n−1). Further, d denotes the diameter of a nozzle hole at the ink room side, and w denotes the channel groove width. There are two kinds of channel groove; 8 denotes a groove to become an ink room filled with ink corresponding to a nozzle hole, and 9 denotes a groove to become a dummy not to be filled with ink.

The characteristic values of an ink jet head produced in this example were as follows.

EXAMPLE 1

(pitch): 0.141 mm, n (number of nozzles): 256,

L (total length)=P×(n−1) 35.955 mm,

ΔT: 75° C., w (channel width): 0.040 mm, d (nozzle diameter at the ink room side): 0.036 mm, and the linear coefficient of thermal expansion (αf) of the composite member 3 obtained was 7.25 ppm.

The linear coefficient of thermal expansion of the actuator (PZT) (αa) is 7.00 ppm, and by the substitution of these values in the above-mentioned inequality 1 for calculation, following result was obtained:

$$\alpha f=7.25(ppm)<(w/2)/(L\times\Delta T)+\alpha a=14.4(\text{ppm}).$$

By the substitution of those values in the above-mentioned inequality 2, following result was obtained:

$$\alpha f=7.25(ppm)<[(w-d)/2+d/4]/(L\times\Delta T)+\alpha a=11.0(\text{ppm}).$$

By the substitution of those values in the above-mentioned inequality 3, following result was obtained:

$$\alpha f=7.25(ppm)<[(w-d)/2]/(L\times\Delta T)+\alpha a=7.7(\text{ppm}).$$

Thus, it is found that the values satisfy any one of the inequalities 1 to 6.

The channel grooves of the actuator and the nozzle holes of the nozzle plate after being left cooled approximately agreed with each other within the allowable range.

EXAMPLE 2 w (channel width): 0.080 mm

Thickness of the supporting member: 0.3 mm

Other characteristic values of the inkjet head of Example 2 are same as those of Example 1.

Thus, it is found that the values of Example 2 also satisfy any one of the inequalities 1 to 6. And the channel grooves of the actuator and the nozzle holes of the nozzle plate after being left cooled approximately agreed with each other within the allowable range.

Figure 2:
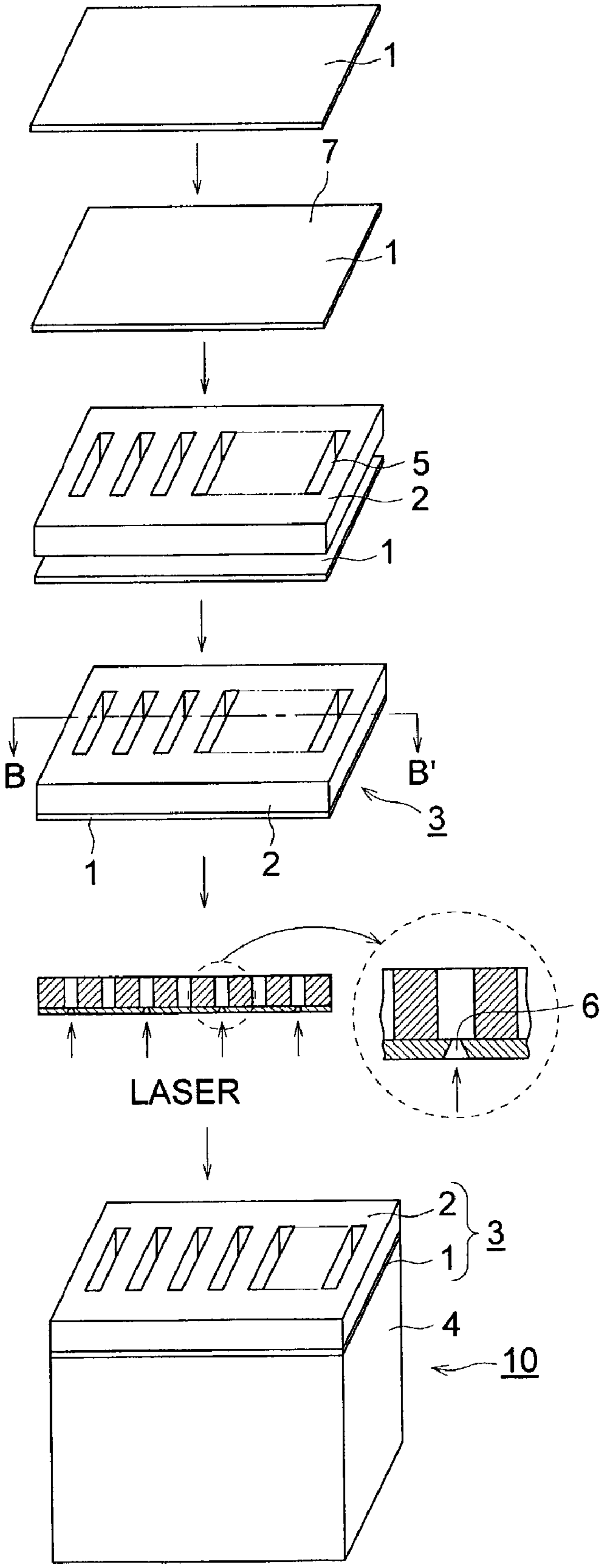
FIG. 2 is a process drawing showing another concrete example of a method of manufacturing ink jet heads of this invention.

FIG. 2 is a process drawing showing another concrete example of a method of manufacturing ink jet heads of this invention using PZT for the support member. The difference from the above-mentioned process shown in FIG. 1 is that the working of the nozzle holes by a laser beam is made from the nozzle plate side and after that the bonding with the actuator is made at the nozzle plate side in this method of manufacturing an ink jet head. The ink jet head 10 manufactured by this method may be used as it is, but it is also appropriate to have a process for removing the support member 2 afterwards.

In the case of the manufacturing method shown in FIG. 2, for the shape of the opening portions of the support member, it is possible to select one out of various kinds of shape.

Figure 3:
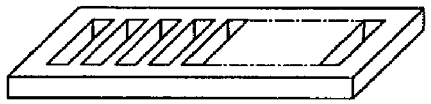
FIGS. 3(*a*) to 3(*g*) is a drawing showing the shape of opening portions of support members.
Figure 3:
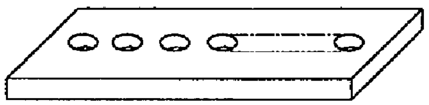
Figure 3:
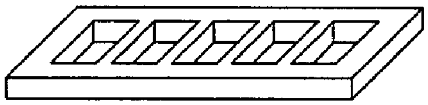
Figure 3:
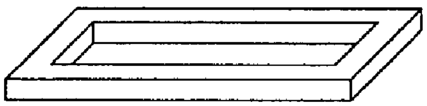
Figure 3:
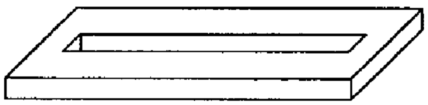
Figure 3:
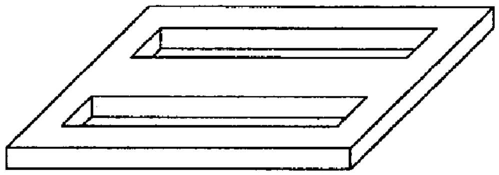
Figure 3:
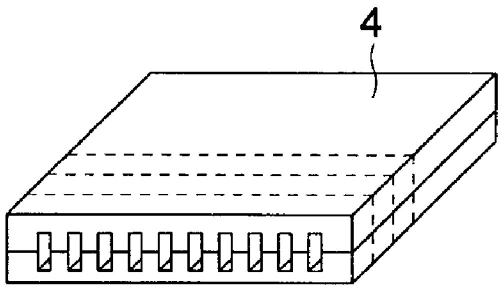

FIG. 3 is a drawing showing the shape of the opening portions of support members. In the case of a composite member of a type having its supporting member bonded with the actuator, it is desirable to make the opening portions have a shape approximating to the channel grooves of the actuator; FIG. 3(*a*) shows one that is made through cutting the actuator formed as shown in FIG. 3(*g*) to have completely the same shape as the actuator. Further, FIG. 3(*b*) shows a supporting member having each of the opening portions of a circular shape corresponding to each channel groove of the actuator.

In the case of the composite member formed by the process shown in FIG. 2 of a type wherein its nozzle plate side is bonded to the actuator, it is not always required to make the support member have a shape approximating to the channel grooves of the actuator, and as shown in (c) to (f) of the same drawing, it may be appropriate a support member of a type wherein one opening portion is formed in correspondence to the plural channel grooves; that is, for example, one having a shape of a ladder (c), one having a shape of an outer frame forming one opening including all the channels (d), (e), and one having two-stage, upper and lower openings may be appropriate.

The position adjustment between the actuator and the composite member was made by an adjustment method making the pressing contact of two surfaces of each of them with a fixture.

Figure 5:
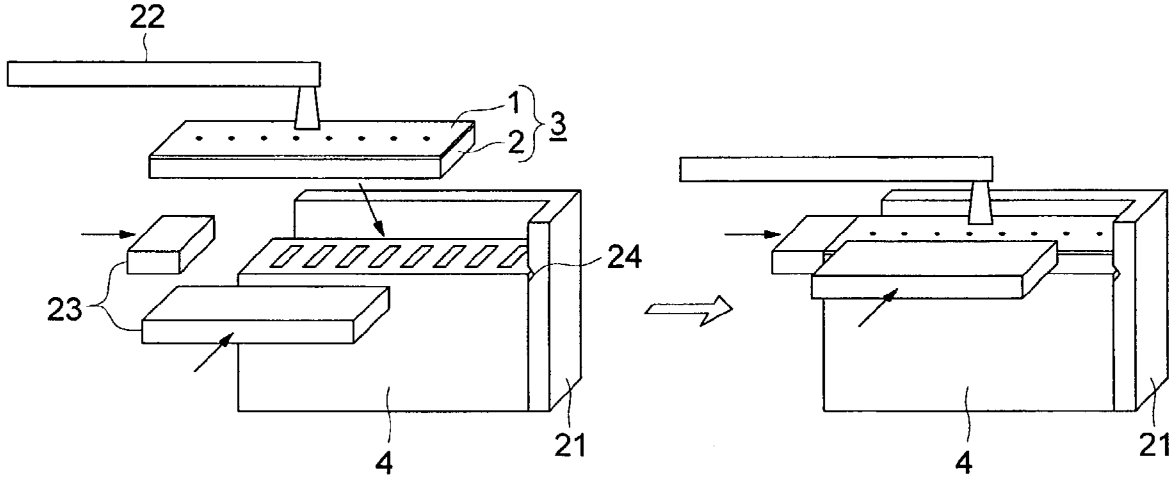
FIG. 5 is a drawing showing that the position adjustment at the time the composite member and the actuator are bonded together by heating is made by a method of pressing contact with a fixture.

FIG. 5 shows that the position adjustment at the time the composite member and the actuator are bonded together by heating is made by a pressing contact method.

As shown in FIG. 5, two surfaces of the actuator coated with a thermosetting adhesive on the bonding surface are pressed to an L-shaped fixture 21 and held. Next, the composite member 3 having nozzle holes bored is moved over to the actuator as being held by the suction force of a suction hand 22, and after it is brought into contact with the bonding surface, it is pressed to the fixture 21 by a pusher 23 to come to have its position adjusted. After that, the adhesive is hardened by heating, and the composite member is fixed to the actuator. Further, in order to prevent an abnormal bonding of the member to the fixture owing to the thermosetting adhesive being forced out, it is desirable to provide a clearance portion 24.

The bonding of the actuator with the nozzle plate having the nozzle holes bored in a conventional method of manufacturing ink jet heads is done in the following way. The actuator is fixed, the bonding surface is coated with a thermosetting adhesive, the film-shaped nozzle plate is moved as being held by the suction force of a suction device, and after the position adjustment of the nozzle holes and the channels of the actuator is made as being observed with a microscope from the upper side, the nozzle plate is fixed to be bonded. This requires skill of the operator and a complex mechanical device, which makes the ratio of bad products high.

By the application of a method of manufacturing ink jet heads of this invention using a composite member, the position adjustment based on a pressing contact method becomes possible, which makes the operation easy, and skill of the operator is not required; thus, the ratio of bad products could be reduced by a large margin.

Further, explanation has been given on the premise that the fixed point at the time the composite member of this invention is bonded to the actuator is the nozzle hole at the end position; however, by making the approximately central position of an ink jet head be the fixed point, it becomes possible to manufacture ink jet heads having a twice length at a good accuracy.

After the support member is bonded by heating to the nozzle plate before the formation of the nozzle holes to make a composite member, the nozzle holes are formed in the nozzle plate, and subsequently the nozzle plate is bonded to the actuator. By this procedure, handling of the nozzle plate provided on the support member becomes extremely easy in the course of bonding the nozzle plate to the actuator by heating, and positional registration of the actuator with the nozzle plate becomes easy, and also it has become possible to form nozzle holes having a desirable tapering shape easily. Further, by making the thermal expansion coefficient of the composite member to satisfy the above-mentioned inequality 1 to 6, it has become possible to make the positional deviation between the channels of the actuator and the nozzle holes of the nozzle plate fall within an allowable range.

What is claimed is:

1. A method of manufacturing an ink jet head, comprising:

(1) bonding a nozzle plate and a support member by heating to make a composite member, said support member supporting the nozzle plate to suppress a thermal expansion of the nozzle plate;

(2) forming nozzle holes in the nozzle plate of the composite member made in step (1); and (3) bonding the composite member having the nozzle holes formed in step (2) to an actuator by heating using a thermosetting adhesive, such that a support member side of the composite member contacts the actuator.

2. The method of manufacturing an ink jet head of claim 1, wherein a linear coefficient of thermal expansion of the composite member and a linear coefficient of thermal expansion of the actuator satisfy the inequality:

$$\alpha f<(w/2)/(L\times\Delta T)+\alpha a$$

where:

$\alpha f$ is the linear coefficient of thermal expansion of the composite member, $\alpha a$ is the linear coefficient of thermal expansion of the actuator, w is a channel width in the actuator, $\Delta T$ is a temperature difference between maximum and minimum temperatures during the bonding of the composite member to the actuator by heating, P is a pitch of the nozzle holes, n is a number of nozzles, and L is a length between both end nozzle holes in the composite member, and $L=P\times(n-1)$.

3. The method of manufacturing an ink jet head of claim 1, wherein a linear coefficient of thermal expansion of the composite member and a linear coefficient of thermal expansion of the actuator satisfy the inequality:

$$\alpha f<[(w-d)/2+d/4]/(L\times\Delta T)+\alpha a$$

where;

$\alpha f$ is a linear coefficient of thermal expansion of the composite member, $\alpha a$ is a linear coefficient of thermal expansion of the actuator, w is a channel width in the actuator, d is a nozzle diameter at a side of an ink room, $\Delta T$ is a temperature difference between maximum and minimum temperatures during the bonding of the composite member to the actuator by heating, P is a pitch of the nozzle holes, n is a number of nozzles, and L is a length between both end nozzle holes in the composite member, and $L=P\times(n-1)$.

4. The method of manufacturing an ink jet head of claim 1, wherein a linear coefficient of thermal expansion of the composite member and a linear coefficient of thermal expansion of the actuator satisfy the inequality:

$$\alpha f<[(w-d)/2]/(L\times\Delta T)+\alpha a$$

where;

$\alpha f$ is a linear coefficient of thermal expansion of the composite member, $\alpha a$ is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

5. The method of manufacturing an ink jet head of claim 1, wherein a linear coefficient of thermal expansion of the composite member and a linear coefficient of thermal expansion of the actuator satisfy the inequality:

$$?\alpha f-\alpha a?<w/2/(L\times\Delta T)$$

where:

αf is a linear coefficient of thermal expansion of the composite member,

αa is a linear coefficient of thermal expansion of the actuator, w is a channel width in the actuator, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

6. The method of manufacturing an ink jet head of claim 1, wherein a linear coefficient of thermal expansion of the composite member and a linear coefficient of thermal expansion of the actuator satisfy the inequality:

$$?\alpha f-\alpha a?<[(w-d)/2+d/4]/(L\times\Delta T)$$

where;

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

7. The method of manufacturing an ink jet head of claim 1, wherein a linear coefficient of thermal expansion of the composite member and a linear coefficient of thermal expansion of the actuator satisfy the inequality:

$$?\alpha f-\alpha a?<[(w-d)/2]/(L\times\Delta T)$$

where:

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

8. The method of manufacturing an ink jet head of claim 1, wherein a thickness of the supporting member is from 0.2 mm to 1.0 mm.

9. The method of manufacturing an ink jet head of claim 1, wherein the support member has an opening portion that is open before support member is bonded with the nozzle plate.

10. The method of manufacturing an ink jet head of claim 9, wherein a shape of the opening portion of the support member corresponds to channel grooves formed in the actuator.

11. The method of manufacturing an ink jet head of claim 1, wherein the nozzle holes are formed by laser working from a support member side of the composite member.

12. A method of manufacturing an ink jet head, comprising:

(1) bonding a nozzle plate and a support member by heating to make a composite member, said support member supporting the nozzle plate to suppress a thermal expansion of the nozzle plate;

(2) forming nozzle holes in the nozzle plate of the composite member made in step (1); and (3) bonding the composite member having the nozzle holes formed in step (2) to an actuator by heating using a thermosetting adhesive, such that a nozzle plate side of the composite member contacts the actuator.

13. The method of manufacturing an ink jet head of claim 12, wherein a linear coefficient of thermal expansion of the composite member and a linear coefficient of thermal expansion of the actuator satisfy the inequality:

$$\alpha f<(w/2)/(L\times\Delta T)+\alpha a$$

where:

αf is a linear coefficient of thermal expansion of the composite member,

αa is a linear coefficient of thermal expansion of the actuator, w is a channel width in the actuator, ΔT is a temperature difference between maximum and minimum temperatures during the bonding of the composite member to the actuator by heating, P is a pitch of the nozzle holes, n is a number of nozzles, and L is a length between both end sided nozzle holes in the composite member, and L=P×(n−1).

14. The method of manufacturing an ink jet head of claim 12, wherein a linear coefficient of thermal expansion of the composite member and a linear coefficient of thermal expansion of the actuator satisfy the inequality:

$$\alpha f<[(w-d)/2+d/4]/(L\times\Delta T)+\alpha a$$

where:

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n: is a number of nozzles, and L is a length between both end nozzle holes in the composite member, and L=P×(n−1).

15. The method of manufacturing an ink jet head of claim 12, wherein a linear coefficient of thermal expansion of the composite member and a linear coefficient of thermal expansion of the actuator satisfy the inequality:

$$\alpha f<[(w-d)/2]/(L\times\Delta T)+\alpha a$$

where;

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

16. The method of manufacturing an ink jet head of claim 12, wherein a linear coefficient of thermal expansion of the composite member and a linear coefficient of thermal expansion of the actuator satisfy the inequality:

$$?\alpha f-\alpha a?<w/2/(L\times\Delta T)$$

where;

αf is a linear coefficient of thermal expansion of the composite member,

αa is a linear coefficient of thermal expansion of the actuator, w is a channel width in the actuator, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

17. The method of manufacturing an ink jet head of claim 12, wherein a linear coefficient of thermal expansion of the composite member and a linear coefficient of thermal expansion of the actuator satisfy the inequality:

$$?\alpha f-\alpha a?<[(w-d)/2+d/4]/(L\times\Delta T)$$

where;

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

18. The method of manufacturing an ink jet head of claim 12, wherein a linear coefficient of thermal expansion of the composite member and a linear coefficient of thermal expansion of the actuator satisfy the inequality:

$$?\alpha f-\alpha a?<[(w-d)/2]/(L\times\Delta T)$$

where;

αf is a linear coefficient of thermal expansion of the composite member,

αa is a linear coefficient of thermal expansion of the actuator, w is a channel width in the actuator, d is a nozzle diameter at a side of an ink room, ΔT is a temperature difference between maximum and minimum temperatures during the bonding of the composite member to the actuator by heating, P is a pitch of the nozzle holes, n is a number of nozzles, L is a length between both end nozzle holes in the composite member, and L=P×(n−1).

19. The method of manufacturing an ink jet head of claim 12, wherein a thickness of the supporting member is from 0.2 mm to 1.0 mm.

20. The method of manufacturing an ink jet head of claim 12, wherein the support member has an opening portion that is open before the support member is bonded with the nozzle plate.

21. The method of manufacturing an ink jet head of claim 20, wherein a shape of the opening portion of the support member corresponds to channel grooves formed in the actuator.

22. The method of manufacturing an ink jet head of claim 20, wherein the support member has a ladder shape including one opening for every two or more channel grooves in the actuator.

23. The method of manufacturing an ink jet head of claim 20, wherein the support member has an outer frame shape defining an opening including all channel grooves of the actuator.

24. The method of manufacturing an ink jet head of claim 12, wherein the nozzle holes are formed by laser working from a nozzle plate side of the composite member.

25. The method of manufacturing an ink jet head of claim 12, further comprising:

removing the support member after the composite member and the actuator are bonded together by heating.

26. The method of manufacturing an ink jet head of claim 1, further comprising conducting position adjustment when the composite member and the actuator are bonded together by heating by pressing contact with a fixture.

* * * * *